United States Patent Office.

ALSON A. LOTHROP, OF NEPONSET, MASSACHUSETTS.

Letters Patent No. 97,417, dated November 30, 1869.

IMPROVED METALLIC SOLUTION FOR COATING IRON AND STEEL.

The Schedule referred to in these Letters Patent and making part of the same

*To all whom it may concern:*

Be it known that I, ALSON A. LOTHROP, of Neponset, in the county of Norfolk, and State of Massachusetts, have invented a new Solution for Coating Iron and Steel; and I hereby declare the following to be a full, clear, and exact description thereof.

My invention has for its object to provide a rapid and economical means of coating iron and steel; and consists in immersing the article to be coated in a solution of sulphate of copper or blue vitriol and water, with the addition of tin.

To enable others skilled in the art to understand and use my invention, I will proceed to describe the manner in which I have carried it out.

I make a solution, composed of sulphate of copper or blue vitriol and water, to which I add tin, reduced to thin scales or minute particles, so that it may be readily acted upon and united with the copper contained in the solution, thus forming a preparation into which the articles to be coated are dipped, (they having been previously cleaned in the usual manner by rinsing in a bath of dilute sulphuric acid, and then in clean water,) when they instantly receive a thin film or covering of the combined copper and tin.

By varying the proportions of the ingredients of which the solution is composed, the shade or color of the coating may be varied.

After being dipped in the solution, the articles are immediately washed and dried, which completes the operation.

Claim.

What I claim as my invention, and desire to secure by Letters Patent, is—

A solution, composed of the ingredients set forth, for coating iron or steel.

ALSON A. LOTHROP.

Witnesses:
N. W. STEARNS,
P. E. TESCHEMACHER.